March 4, 1969   F. W. PEPE   3,430,905
FASTENING DEVICE
Filed Aug. 21, 1967
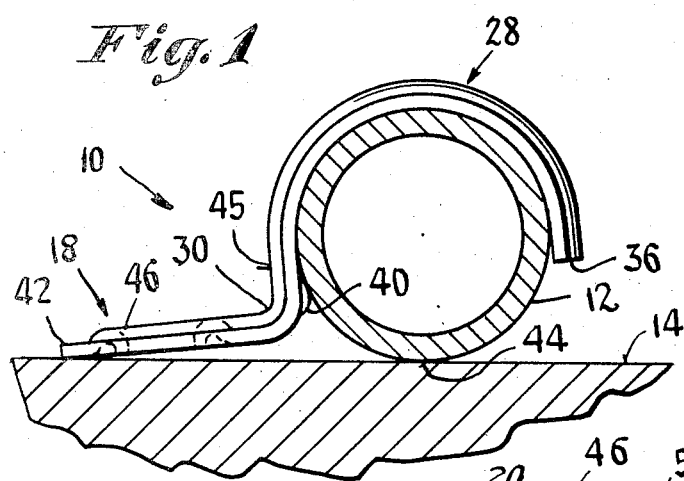
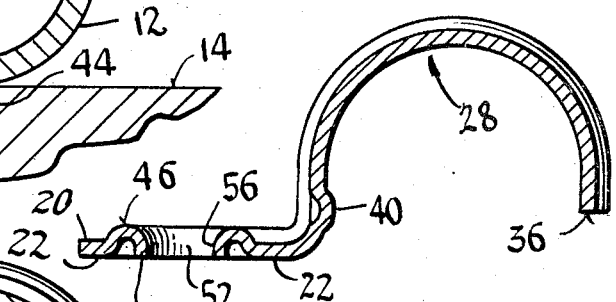
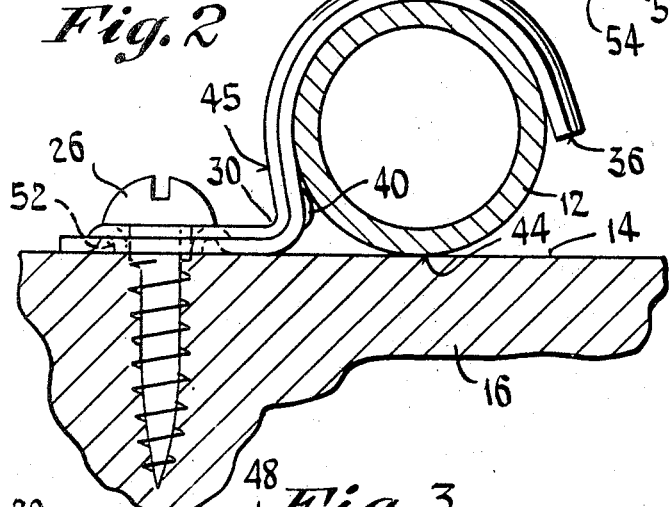
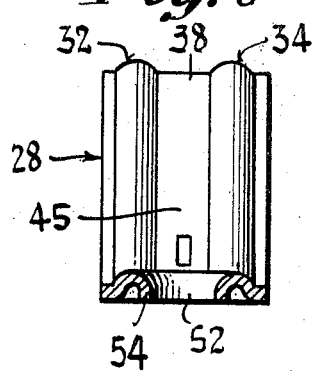
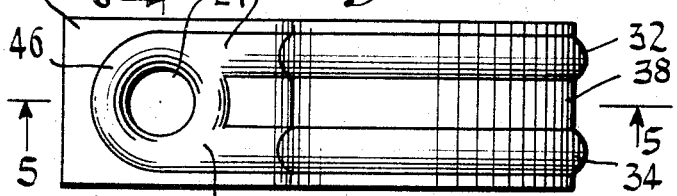
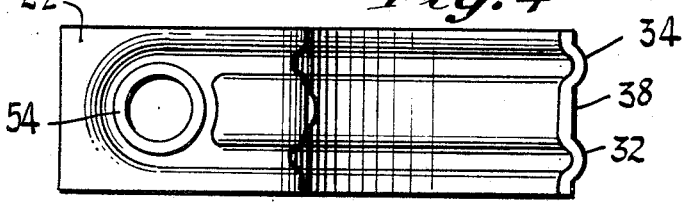
INVENTOR.
Frank W. Pepe
BY
Martin P. Wittstein
ATTORNEY United States Patent Office 3,430,905
Patented Mar. 4, 1969

3,430,905
FASTENING DEVICE
Frank W. Pepe, Lordship, Conn., assignor to Arc-Co Incorporated, Bridgeport, Conn., a corporation of Connecticut
Filed Aug. 21, 1967, Ser. No. 661,881
U.S. Cl. 248—74       4 Claims
Int. Cl. F16l 3/04

ABSTRACT OF THE DISCLOSURE

A relatively rigid clamp-type fastening device for securing pipe and the like to a supporting surface, having a flat securing portion and an integral hook-shaped pipe holding portion. The flat end securing portion has an aperture surrounded by a raised or bulged annular strengthening area and is provided with an integrally formed support portion extending oppositely from the raised annular area to prevent collapse thereof when excessive pressure is applied to the flat securing portion by a securing element passed through the aperture.

*Brief summary*

The present invention relates generally to clamp-type fastening devices and more particularly to improvements in single hole pipe clamps for securing pipe to a supporting surface.

A pipe clamp of the type to which the present invention relates generally comprises an elongate metal body member having a substantially flat end portion provided with an aperture through which a securing element, such as a screw or bolt, is passed for securing the clamp to a supporting surface. A generally semi-cylindrical hook portion is integrally connected to the flat portion and is shaped so as to encircle at least a portion of the pipe when the clamp is secured to the supporting surface. The shape of the hook portion and the location of the juncture between the hook portion and the flat end portion is usually such that the flat portion is not parallel to the supporting surface and does not make planar contact therewith when the clamp is merely placed over a pipe resting on the supporting surface. The reason for this is that when a securing element is passed through the aperture and forcibly driven into the supporting surface, the flat end portion of the clamp is forced to move toward the supporting surface and ultimately made to be parallel therewith, thereby making planar contact with the supporting surface. The hook portion bends at the aforementioned juncture and also bends around the pipe to accommodate for the movement of the flat end portion, thereby so stressing the hook portion as to place it under great tension in the direction of the supporting surface for the purpose of maintaining constant and considerable pressure on the pipe to hold the latter firmly in place.

As will become more apparent from the detailed description which follows, a tremendous amount of force directed axially of the aperture is required to press the flat end portion of the clamp against the supporting surface because of the high degree of resistance to deformation of the hook portion. Further, the entire force exerted by the securing element is concentrated in an area immediately surrounding the aperture.

In order to avoid the inherent weakness of an apertured flat strip in the areas between the aperture and the opposite edges of the strip, which in the type of clamps presently under consideration would cause fracture in these areas of the flat end portion of such clamps before the end portion was fully seated on the supporting surface, it has been common place to provide the flat end portion with a raised or bulged annular area surrounding the aperture, thereby reinforcing the flat end portion, particularly in the aforementioned areas, so that they are substantially better able to withstand the force required to properly seat the entire flat end portion on the supporting surface. An important advantage of this construction is that the clamp can be made of thinner gage and/or weaker material without loss of pipe holding ability, since it has been found that the amount of force exerted on the pipe by deformation of the hook portion when the clamp is formed from strip stock thick and/or strong enough to resist fracture adjacent the aperture without the raised annular area, is considerably in excess of the force actually required to hold the pipe firmly in place on the supporting surface.

There are, however, two significant disadvantages resulting from this construction. One is that the force exerted by the securing element is concentrated into an even smaller area of the flat end portion than it is without the raised or bulged annular area; the other is that installation personnel are usually either not aware of the maximum amount of force which can be applied to the raised annular area before it will collapse, or they are not careful to observe whether or not that area is beginning to collapse before they stop applying froce to the securing element. The result of the first disadvantage is the possible collapse and fracture of the raised annular area while the flat end portion is moving toward the supporting surface; the result of the second disadvantage is possible collapse and fracture of the raised annular area after the flat end portion is fully seated on the supporting surface by while the workman is still inadvertently or intentionally applying excessive force to the securing element. Either of these results causes the flat end portion to be greatly weakened, if not altogether broken, and thereby results in loss of holding ability of the hook portion of the clamp.

A third aspect to be considered is the fact that clamps of the type to which the present invention relates are often secured to a masonry wall by means of special securing elements which are explosively driven into the wall by powder actuated driving devices which customarily utilize a .22 caliber cartridge. It is apparent that this fastening method imposes of sudden and tremendous impact on the raised annular area which very often collapses this area and thereby precludes the use of these tools.

The foregoing undesirable results of known clamps are very substantially eliminated by the present invention. I have discovered that buckling and collapse of the raised annular area can be prevented, both during movement of the flat end portion toward the supporting surface and after the flat end portion is fully seated on the supporting surface regardless of the amount of force thereafter applied to the securing element. This is accomplished by providing an annular cylindrical portion or ring of the material of the clamp which performs the dual functions of strengthening the raised annular area against buckling and collapse and also providing a seating surface for the raised annular area for support thereof which is independent of the seating surface underlying the rest of the flat end portion of the clamp.

Briefly, the cylindrical portion or ring is integrally connected to the radial inner edge of the raised annular area and extends therefrom in cylindrical fashion substantially to the plane of the seating surface of the flat end portion. The inner surface of the ring defines the aperture through which the securing element is passed, and the free end of the ring is preferably formed to be flat so as to effectively provide the aforementioned seating surface for the raised annular area.

The ring greatly strengthens the raised annular area immediately surrounding the aperture which, in known clamps, is defined by the radial inner edge of the raised annular area, thereby preventing buckling and collapse of this area while the flat end portion is moving toward the supporting surface under the influence of force exerted on the securing element. The significance of this feature of the invention is more apparent when one appreciates the tremendous amount of force which must be applied by the securing element to the raised annular area in order to seat the flat end portion while simultaneously deforming a portion of the clamp to impart the desired amount of holding force stress thereto.

In addition, since the ring is preferably cylindrical in the direction of force applied to the securing element, it has the ability to withstand a tremendous force in compression, thereby preventing collapse of the raised annular area almost regardless of the amount of force applied to the securing element after the flat end portion is fully seated on the supporting surface.

Having briefly described a preferred embodiment of the present invention, it is a principal object thereof to provide an improved fastening device for securing pipe and the like to a flat supporting surface.

Another object of the present invention is to provide a pipe clamp type fastening device which will not be weakened or break as the result of excessive force being applied to a securing element.

Still another object of the present invention is to provide a pipe clamp type fastening device in which a reinforcing bulge formed in a flat securing portion of the clamp will not collapse from the force required to deform the clamp into a stressed condition in which it maintains a constant holding force on the pipe.

Yet another object of the present invention is to provide a pipe clamp type fastening device in which a reinforcing bulge formed in a flat securing portion of the clamp will not collapse from intentionally or inadvertently applied excessive force after the flat securing portion has been fully seated on a supporting surface.

These and other objects and advantages of the present invention will become more apparent from an understanding of the following detailed description of a preferred embodiment of the present invention when considered in conjunction with the accompanying drawings in which:

FIG. 1 is an elevational view of a fastening device constructed in accordance with the principles of the present invention, showing the fastening device in the position it assumes immediately after being placed on a pipe or like member;

FIG. 2 is an elevational view similar to FIG. 1 showing the fastening device in its fully operative position after being secured to a supporting surface;

FIG. 3 is a plan view of the fastening device of FIG. 1;

FIG. 4 is a bottom view of the fastening device of FIG. 1; and

FIGS. 5 and 6 are sectional views taken on the lines 5—5 and 6—6 respectively of FIG. 3.

*Detailed description*

Referring now to the drawings, the numeral 10 designates generally a fastening device of the type used to firmly secure a pipe 12 or the like to a supporting surface 14 which may be the surface of a wall 16, ceiling, etc. While the pipe 12 is shown for illustrative purposes, it will be apparent that the clamp 10 may be used in conjunction with any hollow or solid substantially cylindrical member.

The clamp 10 is formed from an elongate strip of relatively rigid shape retaining material having a limited amount of resilience, and comprises a substantially flat end portion 18 having opposed surfaces 20 and 22, the surface 22 being a seating surface adapted to rest on the supporting surface 14 when the clamp 10 is fully seated thereon as shown in FIG. 2. The flat end portion 18 is provided with an aperture 24 through which a securing element such as the screw 26 is passed for securing the clamp 10 to the supporting surface 14.

The clamp 10 further comprises a substantially semi-cylindrical hook portion 28 which is integrally connected to the flat end portion 18 at a juncture 30, the flat end portion 18 and the hook portion 28 defining at the juncture 30 substantially a right angle. The hook portion 28 is provided with a pair of parallel ribs 32 and 34 respectively which extend from the free end 36 of the hook portion 28 through the juncture 30 and into the flat end portion 18, which ribs serve to strengthen the otherwise flat web portion 38 of the clamp 10.

The hook portion 28 is provided with a dimple 40 or other suitable projection disposed in the web 38 and located adjacent to the juncture 30, the dimple 40 cooperating with the free end 36 of the hook portion 28 to define an entryway into the hook portion 28 which is slightly less than the diameter of the pipe 12. By this construction, the clamp 10 has a snap-over-center press fit on the pipe when forced thereon due to the limited resilience of the material from which the clamp 10 is formed, and it will stay where it is placed prior to being secured to the supporting surface 14.

It will be readily apparent from a comparison of FIGS. 1 and 2 that the clamp 10 is initially formed so that the flat end portion 18 is disposed at an angle to the supporting surface 14 when the clamp 10 is placed over the pipe 12 but before it is fully seated on the supporting surface. Thus the juncture 30 between the flat end portion 18 and the hook portion 28 is located above a line which passes through the free end 42 of the flat end portion and is tangent at a point 44 to the geometrical projection of the inner surface of the hook portion 28 which projection corresponds to the exposed surface of the pipe 12, this line being in the plane of the supporting surface 14. Thus, when the screw 26 is passed through the aperture 24 and driven into the wall 16 is a direction perpendicular to the supporting surface, the screw forces the flat end portion toward the supporting surface 14 and seats it thereon. This movement requires that a tremendous amount of force be exerted on the flat end portion by the screw for the reason that the clamp 10 is resisting deformation both at the juncture 30 and along a portion 45 of the circumference of the hook portion 28 immediately above the dimple 40, the latter resulting in the angle at the juncture 30 being reduced to less than substantially a right angle. However, this deformation of the hook portion 28 and the juncture 30 is necessary to stress the clamp 10 so as to place it under tension generally in the direction of the pipe, whereby the hook portion 28 maintains a constant and substantial holding force on the pipe and prevents the latter from having any freedom of movement.

The clamp 10 is further provided with a raised annular area 46 which, in the form of the clamp illustrated, is constituted by a raised rib projecting from the plane of the surface 20 of the flat end portion 18. It will be understood, however, that any form of projection above the plane of the surface 20 may be provided. The rib 46 merges with the terminal portions 48 and 50 of the ribs 32 and 34 respectively. The raised annular area 46 is intended to strengthen the flat end portion 18 against fracture during movement of the latter toward the seating surface 14, but has not been altogether satisfactory for this purpose due to the concentration of the force of the screw into the relatively small area defined by the contact surface of the uppermost part of the raised annular area and the lower surface of the head of the screw 26. The result of this concentration of force is buckling and collapse of the raised annular area 46 and consequent weakening of the flat end portion 18, particularly in the locations between the aperture 24 and the side edges of the flat end portion, both during movement of the latter toward the seating surface and thereafter if excessive force is applied to the screw.

I have found that these drawbacks of known clamps are substantially eliminated by the addition to the raised annular area 46 of an annular substantially cylindrical portion or ring 52 which is formed integrally with the raised annular area 46. The ring 52 is an annular extension of the raised annular area 46 and extends in cylindrical manner in a direction opposite to the raised annular area, that is from the latter toward the surface 22 of the flat end portion 18. The ring 52 terminates in a flat seating surface 54 which is disposed substantially in the plane of the seating surface 22 of the flat end portion 18. The inner cylindrical surface 56 of the ring 52 now defines the aperture 24 through which the screw 26 is passed for securing the clamp 10 to the wall 16.

It will be understood from the foregoing that the added material provided by the ring 52 so strengthens the raised annular area 46 immediately surrounding what would otherwise be the radial free inner edge thereof that it can withstand the large and concentrated force applied to the contact surface between the raised annular area 46 and the head of the screw 26, thereby effectively preventing any buckling and collapse and possible fracture of the raised annular area while the flat end portion 18 is moving toward the seating surface 14.

It will be further understood that, after the flat end portion 18 has been fully seated on the supporting surface 14 as shown in FIG. 2, with the seating surface 54 of the ring 52 also contacting the supporting surface 14, any further application of force to the screw 26, either intentionally or inadvertently applied, will be withstood by the ring 52 due to the ability of the latter to withstand a great amount of compressive force. Thus the flat end portion cannot be damaged by a careless workman who continues to apply tightening force to the securing element 26 even after the flat end portion 18 is fully seated on the supporting surface. Also, the flat end portion cannot be damaged, either during movement thereof toward the supporting surface 14 or after it is fully seated thereon, by the sudden and severe blow imposed on the flat end portion by a powder actuated driving tool in the event that such tool is utilized to drive a masonry nail or tack into a masonry wall.

It should be noted that the cylindrical member or ring 52 need not be solid as shown, nor need it be absolutely cylindrical; rather it may be notched in a plurality of places or otherwise similarly configurated, and it may be slightly tapered either inwardly or outwardly toward the seating surface, the critical features being that there must be sufficient material formed integrally with the raised annular area 46 to strengthen it as distinguished from leaving it with predominantly a radial free inner edge, and there must be an ample portion of the ring 52 providing the seating surface 54 to withstand any reasonable degree of excessive force which may be applied to the securing element.

It is apparent from the foregoing that there is provided an improved pipe clamp type fastening device which effectively avoids the disadvantages of known similar devices and which achieves the foregoing objects of the invention. It is to be understood that the device described and shown herein is merely illustrative of the best mode presently contemplated for carrying out the principles of the present invention, the latter being intended to cover all such variations, modifications and equivalents thereof as may be encompassed within the scope of the claims appended hereto.

What I claim and desire to secure by Letters Patent is:
1. A fastening device for securing a cylindrical member to a supporting surface, said device comprising
   A. a body member formed of an elongate strip of relatively rigid shape retaining material and having
      (1) a generally flat end portion having opposed surfaces one of which is a seating surface and being provided with an aperture therethrough for receiving a securing element, and
      (2) a substantially semi-cylindrical hook portion integrally connected at one end thereof to said flat end portion and having a free end remote from said one end, said hook portion being adapted to partially encircle a cylindrical member between said ends when said flat end portion is secured to a supporting surface,
   B. said flat end portion having an annular area thereof surrounding said aperture raised out of the plane of said flat end portion in a direction away from said seating surface of said flat end portion, and
   C. means disposed around said aperture and formed integrally with a portion of said raised annular area and extending therefrom substantially to the plane of said one surface for strengthening and supporting said raised annular area to prevent the collapse thereof when excessive force is applied to the opposite surface of said raised annular area by a securing element inserted through said aperture and forcibly driven into a supporting surface.

2. A fastening device as set forth in claim 1 wherein said means for strengthening and supporting said raised annular area comprises a ring formed integrally with said raised annular area and extending in a direction opposite thereto, said ring terminating substantially in the plane of said one surface of said flat end portion.

3. A fastening device as set forth in claim 1 wherein said means for strengthening and supporting said raised annular area comprises a cylindrical extension of said raised annular area, the radial inner surface of which defines said aperture, said extension terminating in a flat seating surface disposed substantially in the plane of said one surface of said flat end portion.

4. A fastening device for securing a cylindrical member to a supporting surface, said device comprising
   A. a body member formed of an elongate strip of relatively rigid shape retaining material and having
      (1) a generally flat end portion having opposed surfaces one of which is a seating surface and being provided with an aperture therethrough for receiving a securing element, and
      (2) a substantially semi-cylindrical hook portion integrally connected at one end thereof to said flat end portion and having a free end remote from said one end, said hook portion being adapted to partially encircle a cylindrical member between said ends when said flat end portion is secured to a supporting surface,
   B. said flat end portion and the adjacent area of said hook portion defining at a juncture thereof substantially a right angle with said juncture being located in relation to said hook portion such that said flat end portion is disposed at an angle to a line passing through the free end or said flat end portion and is tangent to the geometrical projection of the inner surface of said hook portion whereby said flat end portion is adapted to move toward a supporting surface under the influence of a securing element being forcibly driven into the supporting surface,
   C. said flat end portion having an annular area thereof surrounding said aperture raised out of the plane of said flat end portion in a direction away from said seating surface of said flat end portion, and D. means disposed around said aperture and formed integrally with a portion of said raised annular area and extending therefrom substantially to the plane of said one surface for strengthening said raised annular area to prevent collapse thereof when sufficient force is applied to the opposite surface of said raised annular area by said securing element to move said flat end portion to said supporting surface, and for providing support for said raised annular area to prevent collapse thereof when excessive force is applied to said opposite surface of said raised annular area after said flat end portion is fully seated on said supporting surface.

References Cited
UNITED STATES PATENTS

| | | | |
|---|---|---|---|
| 662,935 | 12/1900 | Hibberd | 248—300 X |
| 900,767 | 10/1908 | Nelson | 248—301 |
| 1,381,239 | 6/1921 | Pleister | 248—69 |
| 2,275,007 | 3/1942 | Caestecker | 248—217 |
| 2,972,461 | 2/1961 | Balbach | 248—74 X |
| 3,016,220 | 1/1962 | Rose | 248—74 |

CHANCELLOR E. HARRIS, *Primary Examiner.*

U.S. Cl. X.R.

248—300